(12) United States Patent
Leis et al.

(10) Patent No.: US 9,356,282 B2
(45) Date of Patent: May 31, 2016

(54) METHOD OF MANUFACTURE OF HOMODISPERSED SILICON CARBIDE-DERIVED CARBON COMPOSITES

(75) Inventors: Jaan Leis, Tartu (EE); Mati Arulepp, Tartu (EE)

(73) Assignee: OÜ SKELETON TECHNOLOGIES GROUP, Tallinn (EE)

(*) Notice: Subject to any disclaimer, the term of this patent is extended or adjusted under 35 U.S.C. 154(b) by 0 days.

(21) Appl. No.: 13/822,951

(22) PCT Filed: Sep. 13, 2011

(86) PCT No.: PCT/IB2011/002289
§ 371 (c)(1),
(2), (4) Date: Jun. 6, 2013

(87) PCT Pub. No.: WO2012/035424
PCT Pub. Date: Mar. 22, 2012

(65) Prior Publication Data
US 2013/0240798 A1    Sep. 19, 2013

(30) Foreign Application Priority Data
Sep. 13, 2010  (EE) .................................. 201000073

(51) Int. Cl.
*H01B 1/02*  (2006.01)
*H01M 4/1395*  (2010.01)
(Continued)

(52) U.S. Cl.
CPC ............. *H01M 4/1395* (2013.01); *C01B 31/36* (2013.01); *C04B 35/62834* (2013.01);
(Continued)

(58) Field of Classification Search
CPC ....................................................... H01B 1/04

USPC .............................................. 252/182.1, 502
See application file for complete search history.

(56) References Cited

U.S. PATENT DOCUMENTS

| 6,579,833 B1 * | 6/2003 | McNallan et al. ............ 508/100 |
| 2006/0024969 A1 | 2/2006 | Shive et al. |

(Continued)

FOREIGN PATENT DOCUMENTS

| GB | 971943 | 10/1964 |
| WO | WO 2009/101607 A1 | 8/2009 |
| WO | WO 2010/131973 | * 11/2010 |

OTHER PUBLICATIONS

Choi et al., "Effect of hydrogen on the physical and mechanical properties of silicon carbide-derived carbon films," Surface & Coatings Technology, vol. 204, 2009, pp. 1018-1021.

(Continued)

*Primary Examiner* — Harold Pyon
*Assistant Examiner* — William Young
(74) *Attorney, Agent, or Firm* — Birch, Stewart, Kolasch & Birch, LLP

(57) ABSTRACT

The present invention concerns a method of manufacture of the homodispersed composite of the synthetic carbon material derived from carbide and silicon where the powder of the carbon material is first dispersed mechanically with the powder of silicon to homodispersed mixture, then the homodispersed mixture of the carbon material and silicon is sintered in an inert environment at a temperature between 1200 to 1500° C. to synthetic homodispersed composite of the silicon carbide and silicon. The homodispersed composite of the silicon carbide and silicon is heated in an inert environment at a temperature between 800 to 1100° C. and then the homodispersed composite of the silicon carbide and silicon is chlorinated at a temperature from 800 to 100° C.

14 Claims, 1 Drawing Sheet

(51) Int. Cl.
   *C01B 31/36*    (2006.01)
   *C04B 35/628*   (2006.01)
   *H01M 4/36*     (2006.01)
   *H01M 4/587*    (2010.01)
   *H01B 1/04*     (2006.01)
   *H01M 10/0525*  (2010.01)

(52) U.S. Cl.
   CPC .... *C04B 35/62839* (2013.01); *C04B 35/62892* (2013.01); *H01M 4/364* (2013.01); *H01M 4/587* (2013.01); *C04B 2235/428* (2013.01); *H01B 1/04* (2013.01); *H01M 10/0525* (2013.01)

(56) References Cited

U.S. PATENT DOCUMENTS

| | | | |
|---|---|---|---|
| 2006/0140846 A1* | 6/2006 | Leis et al. | 423/445 R |
| 2009/0117094 A1 | 5/2009 | Leis et al. | |
| 2011/0001097 A1* | 1/2011 | Aramata et al. | 252/521.3 |

OTHER PUBLICATIONS

International Search Report issued in PCT/IB2011/002289, mailed on Jan. 26, 2012.
Written Opinion of the International Searching Authority issued in PCT/IB2011/002289, mailed on Jan. 26, 2012.

* cited by examiner

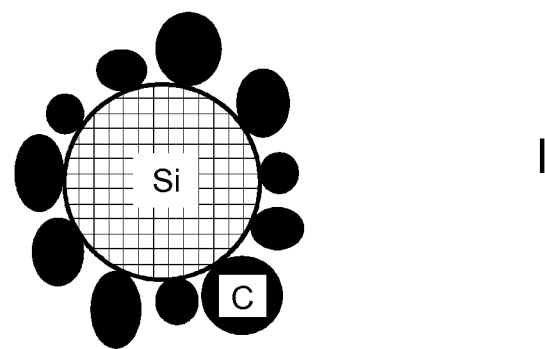
I
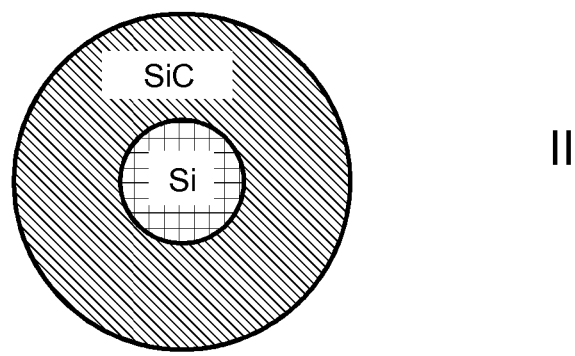
II
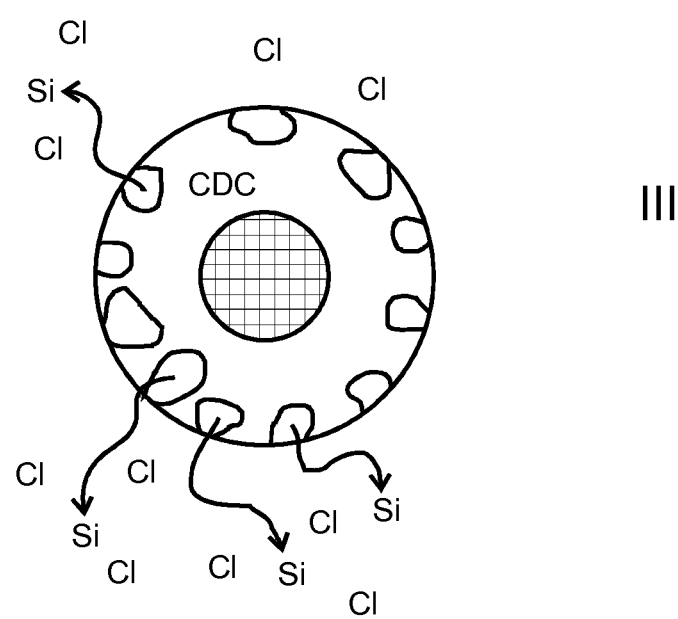
III

METHOD OF MANUFACTURE OF HOMODISPERSED SILICON CARBIDE-DERIVED CARBON COMPOSITES

TECHNICAL FIELD

The present invention relates to composite electrode hybrid condensers and rechargeable Li-ion storage batteries. The invention also relates to the manufacture of a composite of carbide carbon material and silicon that can be used as electrode material.

BACKGROUND ART

The total capacity of the Li-ion element is constituted by the capacities of the anode and cathode. The specific capacity of the cathode is generally approximately 50% lower than the specific capacity of graphite carbon based anode. As finding suitable cathode materials with larger capacity is rather difficult and the list of such materials is limited, the main condition for developing Li-ion elements with high-efficiency is to employ anode material with a remarkably higher capacity than that of graphite. While the theoretical special capacity of graphite is 372 mAh g$^{-1}$, then a considerable improvement of the performance of the Li-ion element would be provided by an anode, the special capacity of which is at least 1000 mAh g$^{-1}$. Possible chemical elements forming alloys with lithium as potential anode materials have been searched from elements such as Sn, Pb, Al, Au, Pt, Zn, Cd, Ag, and Mg. However, the highest potential is seen in silicon (Si), which is on the second place based on its prevalence on earth. In Si—Li alloys, silicon can contain up to a maximum of 4.4 Li atoms that corresponds to the chemical composition $Li_{22}Si_5$ and where the theoretical insertion capacity of lithium is 4200 mAh g$^{-1}$ [1].

Another advantage of silicon anode, in addition to its high theoretical special capacity, is the fact that it works in a narrow range of potentialities between 0.0 V and 0.4 V, which is suitable for working in the Li-ion element. The coulomb efficiency of the recharging-emptying cycle of pure Si anode is only ~35%, and the electrode stops functioning already during a few cycles. The reason lies in the fact that major volume related changes take place in the electrode during the recharging-emptying process. The volume of the $Li2_2Si_5$ alloy per one Si atom is 4 times greater than that of the initial Si atom and corresponds to a 400% expansion of the volume of Si grid. This causes the electrode to crack and resolve which results in the loss of the so-called active mass—decrease in electronic contact and fading of capacity.

To overcome the problems resulting from major volume-related changes, increase coulomb efficiency and improve the cycleability, i.e. the lifespan of Si anodes, several methods have been used [2]. One option is to use Si micro- and nanopowders in anodes [3], in which the spaces between particles buffer the expansion of Si particles. Another option is to incorporate Si particles in active or inactive matrix into composite electrodes [4]. The most common matrix material is carbon, which buffers the volume-related effects in electrodes resulting from the chemical processes on Si surface.

Si/C composite electrode material can be made, for example, from the pyrolysis of various polymethyphenylsiloxanes at 900-1300° C. [4]. Such electrodes have a reversible capacity of ~550 mAh and an irreversible capacity of ~300 mAh whereas the general tendency is that while the temperature during pyrolysis is rising, the reversible capacity increases and irreversible capacity decreases. Such an effect is associated with complete removal of oxygen and formation of SiC at a higher temperature. Also, siloxane polymers made from the alloy of various multiprecursors have been tested as anode materials; it has appeared that with these the rise of oxygen level in composite electrodes increases irreversible capacity and discharging potential [5].

Epoxy silane composites, the pyrolysis of which at 1000° C. creates a carbon of unstratified graphite sheets with a disordered structure, have been studied for determining a suitable Si/C relationship [6]. In certain cases, such composites have a reversible capacity of ~770 mAh g$^{-1}$, but a crucial disadvantage is a large proportion of irreversible capacity. Analogous results have been obtained also with resin-polysilane composite anodes.

As the presence of oxygen in the composite increases the irreversible capacity, oxygen-free compounds have been tested as starting materials for both silicon as well as carbon components—for example benzene, $SiCl_4$ and $(Me)_2Cl_2Si$. The characteristic capacity features of such material are reversible capacity of ~640 mAh g$^{-1}$ and irreversible capacity of ~120 mAh g$^{-1}$. The Si/C composite electrode can be formed by pyrolytic disintegration of silane in carbon microbeds [7]. However, such electrode has a very low coulombic efficiency (45%) compared to a corresponding pure carbon material (77.5%), which is believed to result from the formation of SEI (solid electrolyte interface) layer, the binding of irreversible Li+ and the decrease of active material during cycling.

However, if nano-Si is precipitated during pyrolytic processing into Timcal K-6 graphite, it results in an anode with excellent cycling properties [8]. After a 100$^{th}$ cycle the capacity is reduced by ~1%.

Plasma precipitation method was used to prepare a thin silicon membrane coated with fullerene ($C_{60}$) [9], which, after 50 cycles, had a special capacity of 2000 mAh g$^{-1}$ (with current density 500 µA cm$^{-2}$). An excellent cycleability of such material is found on a polymeric fullerene layer that protects against SEI formation.

In U.S. Pat. No. 5,834,138, Yamada et al, Nov. 10, 1998, a material of negative electrode with solid electrolyte that contains material with sintered and carbonized molecular weight, additionally containing a metallic element, has been described. Whereby the said material is able to chemically bind and release lithium ions.

In U.S. Pat. No. 5,451,477, Sony Corp, Sep. 19, 1995, a storage battery with solid electrolyte, which contains anodes made from carbon material that is able to bind and release lithium ions, has been described. The carbon material is made of graphite, consisting also non-graphitic carbon.

DISCLOSURE OF INVENTION

Carbide derived carbon (CDC), as can be seen from the name, is a carbon material, which is made by extraction of atoms (except for carbon atoms), which produce carbide from a metal or non-metal carbide, from a carbide crystal lattice. The most common way is to treat carbide with chlorine or gaseous hydrochloride at a high temperature. Corresponding chemical reaction is characterized by the chemical equation:

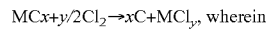

M is the carbide forming metal (for example Ti, Al pr Mo) or non-metal (for example Si or B) and C is CDC.

Based on the chosen carbide and chlorination temperature it is possible to produce carbon material, the microstructure of which is either irregular micro(meso)porous, amorphous graphitic or any interim structure from first to second. Said fact creates presumptions that it is possible to produce CDC, which has the best buffering properties for Si atoms with high Li insertion capacity for active matrix.

Therefore, CDC/Si composites can be made by mechanically stirring nanoporous CDC powders or CDC powders having variable graphitic levels with silicon powder which is then sintered at ~1100° C. Properties and the structure of the composite mostly depend on the size and crystallinity of particles that are sintered together. The composite can be made from both silicon particles with a diameter of a micron as well as amorphous nano-Si particles.

Preparation of CDC/Si composites by precipitation of nano-Si from gas-phase is possible:

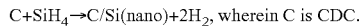
$C + SiH_4 \rightarrow C/Si(nano) + 2H_2$, wherein C is CDC.

Nano-Si precipitation is taught in Holzapfel et al. [10]. Also, it is possible to prepare a composite of nanosilicon powder and CDC by mechanical stirring.

In addition to the mechanical stirring and sintering of CDC and Si powders, the present invention describes chemical methods for preparing various CDC/Si composites. Chemical methods comprise chlorinating carbides according to the general methodology for making CDC. CDC/Si composite is obtained by chlorinating the homodispersed mechanical mixture of carbide and silicon powder at a temperature not exceeding 1000° C. or not achieving a temperature at which Si reacted with gaseous chlorine. The method is described, for example, by chemical equations:

$Al_4C_3 + Si + Cl_2 \rightarrow CDC/Si(amorph.) + AlCl_3$

$TiC + Si + Cl_2 \rightarrow CDC/Si(amorph.) + TiCl_4$

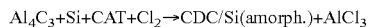
$Al_4C_3 + Si + CAT + Cl_2 \rightarrow CDC/Si(amorph.) + AlCl_3$

$TiC + Si + CAT + Cl_2 \rightarrow CDC/Si(amorph.) + TiCl_4$ wherein CAT is a graphitization catalyst, which can be, for example, a chlorine of d-metal (Fe, Ni, Co) or their mixture. In situ coating of CDC with graphitic carbon (catalytic chlorination of carbide). Yamazaki et al. [11] have shown that the catalytic graphitization of the surface layer of carbon materials improves remarkably the anode capacity and cycleability of carbon. The graphitization of the surface layer of CDC is taught, for example, in the patent application P200800008 [12].

The present invention also describes an option in which the homodispersed mixture of carbide and silicon is obtained by sintering carbon and silicon into silicon carbide, whereas the desirable ratio of Si and SiC is determined by the excess of Si taken into the mixture being sintered. The three-stage method of preparing the corresponding CDC/Si composite is described by the following schemes:

$C + Si \rightarrow SiC/Si + Cl_2 \rightarrow CDC/Si$

$C + Si \rightarrow SiC/Si + CAT + Cl_2 \rightarrow CDC/Si$.

The structure of SiC/Si composite can be adjusted by the size of the particles of carbon and Si being sintered together. If Si particles are bigger than C, Si particles tend to encapsulate into a SiC case. If C particles are bigger than Si, then there is a greater probability that non-encapsulated Si/SiC composites are formed. In the first case, Si particles surrounded by CDC are achieved by the chlorination of SiC/Si composite, as is shown in the enclosed FIGURE, whereas CDC ensures a good conductivity in the composite electrodes and the buffer of the volume change during recharging and emptying. In the second case, the effective surface of Si particle is larger and the accessibility to lithium is better, which probably provides a better capacity for the corresponding anode. However, there is a risk that the non-encapsulated Si of carbide is taken out from the composite during chlorination.

With respect to its properties, carbide derived carbon (CDC) belongs to the non-graphitizing or so-called hard carbons. It is known that hard carbon-anode materials have several advantages in the electrode of the Li-ion battery, but there are also numerous disadvantages compared to graphitic materials, for example mesocarbon micro-beads (MCMB). The advantages are larger capacity [13], longer cycling time [14], better capacity qualities, and, in general also, lower production costs. The capacity (gravimetric) of non-graphitizing or hard carbon anode materials is approximately two times higher than that of graphitic materials, which nowadays are the most common anode materials for Li-ion batteries. In case of hard carbons, one of the problems is the hysteresis appearing between the voltage changes of recharging and emptying. It has been found that hysteresis correlates with the amount of residual hydrogen following pyrolysis (<0.5 mass %) and is almost completely removable, in case the temperature of thermal processing is raised over 1100° C. However, it has been proved that during thermal processing, which is performed at a higher temperature than 1100° C., micro pores in the material start to close, forming so-called "embedded fullerenes". Based on the intercalation tests with fullerene $C_{60}$, it has been found that embedded fullerenes cannot be penetrated by lithium, and, therefore, the number of suitable locations for lithium input during the high temperature microporous carbon decreases.

The CDC/Si composite described in the present invention can be treated with either:

Constant purging of CDC/Si composite in argon at 1000-1200° C.

As the chemically bound residual hydrogen in hard carbon materials is the reason for hysteresis occurring between the recharging and emptying, it can be said that the dechlorination of CDC, which can be performed with hydrogen, increases hysteresis. In some cases, dechlorination is also performed by heating CDC at a high temperature in an inert environment (for example Ar), which, however, might not split all C—Cl bonds due to the reversibility of the dechlorination process. The present invention does not describe whether C—Cl bonds have an affect to the anode capacity of the Li-ion storage battery and its reversibility and how negative it is. Still, Cl is known as a good electronegative leaving group that can therefore increase the irreversible capacity of the anode.

Oxidation of CDC/Si composite in mild conditions (in air or $CO_2$ atmosphere).

By oxidizing carbon with air or $CO_2$ C—H bonds, which are characterized by $sp^2$ and therefore chemically active towards Li, are removed from the surface of the material. It is known that as a result of oxidation, in certain conditions, C—O—C bonds are mainly formed that are passive towards Li.

Covering amorphous CDC in the CDC/Si composite with pyrolytic carbon by heating the composite in a carbon-rich hydrocarbon atmosphere (for example $C_2H_2$ or $CH_4$).

It has been shown that the coal precipitated from the gas phase onto hard carbon materials by pyrolytics (Carbon Black or graphitization or so-called "soft" carbon) substantially reduces the irreversible capacity of the anode of Li-ion storage battery [15]. The effect is conditioned by blocking the active surface of carbon which reduces the counteraction of Li with the radicals on the carbon edges.

Covering amorphous CDC in CDC/Si composite with carbide film.

Carbide has been successfully employed as an electropassive framing of Si [16]. Thus, there is reason to believe that the surface carbidization of CDC in, for example, $TiCl_4/H_2$ atmosphere is also suitable for passivating the chemically active surface of nanoporous CDC.

BRIEF DESCRIPTION OF DRAWINGS

Next, a method according to the invention is described with reference to the enclosed FIGURE, whereas the method of preparing the CDC/Si composite according to the invention, in which during phase I, silicon and carbon particles are dispersed into a homogeneous mixture, in phase II, Si and SIC composite forms as a result of sintering C and Si dispersion, and in phase III, silicon atoms are extracted from carbide in chlorine atmosphere and CDC/SI composite is produced.

BEST MODE FOR CARRYING OUT THE INVENTION

The following examples describe a method for preparing the CDC/Si composite material according to the invention. Compared to the method for making CDC using carbide chlorination known in the prior art, the present invention differs due to the fact that instead of chlorinating the carbide powder, a Si/C powder-like composite of silicon and carbon specially for chlorination is used, which, depending on the atomic amounts of Si and C, might also consist silicon carbide. On the other hand, the methodology for making the CDC/Si composite according to the invention differs from the methodologies of producing carbon-silicon composites known in the prior art due of the fact that the CDC/silicon composite according to the invention is not prepared by mechanical stirring of CDC and silicon neither by precipitating silicon from the gas phase to the surface of CDC or precipitating a silicon-rich chemical compound and its subsequent chemical or thermal decomposition on the surface of CDC.

Example 1

4.4 g of carbon black (Alfa Aesar, CB, acetylene, 99.9+%, 42 nm) and 10.3 g of silicon powder (Aldrich, 99%, −325 mesh) with a molar ratio 1:1 were dispersed in ethanol and then dried at 150° C. The obtained solid mixture was sintered for 1 hour in a horizontal graphite reactor in argon atmosphere at 1450° C. The powdered diffraction analysis of the product proved the 100% conversion of starting materials into β-silicon carbide. The obtained β-SiC powder was put into a horizontal quartz reactor on a quartz plate. The temperature of the reactor was increased up to 1000° C., while washing through the reactor at ~1 l/min. Then, Ar was closed and chlorine was conducted through the reactor at 1.5 l/min for 60 minutes. Then, $Cl_2$ was stopped and the reactor was cooled to room temperature in argon atmosphere. The yield was 4.55 g of powdered material; the powdered diffraction analysis of the material proved a 100% conversion of β-SIC into an amorphous carbon material (carbide-derived-carbon or CDC). For a complete dechlorination of the product, the obtained CDC powder was processed for 2 hours at 800° C. in hydrogen atmosphere. The final yield of the product was 92% of the theoretical one. It appeared from the result that ca 8% of carbon "burned" into $CCl_4$ in the applied reaction conditions. The incineration analysis of the product conducted in air at 800° C. provided 0.3% of residual ash, which excellently coincides to the incineration results of the product that was chlorinated in analogous conditions as the reference example SiC with a commercial 99.9% degree of purification. There is also an excellent coincidence in the characteristics of porosity (the BET specific area (SBET), total porosity [$V_{tot}$] and micro-porosity measured at $N_2$ adsorption [$V_\mu$]), which have been presented in Table 1.

Example 2

The same as Example 1, differing in that the amounts of dispersed Si powder and carbon black were 11.8 g and 3.1 g, respectively, which correspond to the molar ratio ~1.6:1 of Si and C. The final yield was 4.1 g of CDC/Si powder. Considering the fact that in such reaction conditions, such as described in Example 1, carbon in the yield of 92% is formed from stoichiometric Si/C composite, whereas in Example 2, CDC/Si composite material was obtained in which the silicon content was ~30 mass %. The incineration analysis and porosity analysis of the product are presented in Table 1.

Example 3

The same as Example 1, differing in that the amounts of dispersed Si powder and carbon black were 12.1 g and 2.6 g, respectively, which correspond to the molar ratio 2:1 of Si and C. The final yield was 3.67 g of CDC/Si powder. Considering the fact that in such reaction conditions, such as described in Example 1, carbon in the yield of 92% is formed from stoichiometric Si/C composite, whereas in Example 3, CDC/Si composite material was obtained, in which the silicon content was ~35 mass %. The incineration analysis and porosity analysis of the product are presented in Table 1.

Example 4

The same as Example 1, differing in that the amounts of dispersed Si powder and carbon black were 11.2 g and 3.3 g, respectively, which correspond to the molar ratio 1.45:1 of Si and C. In addition, the experiment differs in that, in an additional stage, the product was impregnated with catalyst solution of graphitization after sintering Si powder and carbon black (10 mg/g Fe—Ni—Co catalyst in ethanol) and steamed dry. The final yield was 3.7 g of CDC/Si powder. Considering the fact that in such reaction conditions, such as described in Example 1, carbon in the yield of 92% is formed from stoichiometric Si/C composite, whereas in Example 4, CDC/Si composite material was obtained, in which the silicon content was ~18 mass %. The incineration analysis and porosity analysis of the product are presented in Table 1.

TABLE 1

The composition and porosity characteristics of CDC/Si composites

| Examples of implementation | Starting material | Mass % of Si | Ash % (g) | SBET $m^2/g$ | $V_{tot}$ $cm^3/g$ | $V_\mu$ $cm^3/g$ |
|---|---|---|---|---|---|---|
| Reference example 1 | β-SiC | 0 | 0.3 | 1144 | 0.57 | 0.47 |
| Example 1 | Si/CB, 1:1 | 0 | 0.3 | 1145 | 0.52 | 0.49 |
| Example 2 | Si/CB, 1.6:1 | 30 | 5.5 | 1177 | 0.55 | 0.50 |
| Example 3 | Si/CB, 2:1 | 35 | 8.3 | 1186 | 0.58 | 0.48 |
| Example 4 | Si/CB + CT 1.45:1 | 18 | 3.0 | 490 | 0.43 | 0.17 |
| Reference example 2 | Si + CDC | 27 | 31 | 851 | 0.43 | 0.35 |

The comparison of reference examples 1-3 confirms that the change of proportion of Si in the chlorinated Si/CB mixture affects greatly the element composition of CDC/Si composite and regulates directly of Si content in CDC/Si composite.

The comparison between implementation examples 2 and 4 confirms that by changing chlorination conditions (in this case, using a catalyst) it is possible to substantially change the structural and porous characteristics of CDC/Si composite and, for example, create a carbon casing with either a nanoporous, amorphous or structural regularity (graphitic) around Si.

The reference example 1 confirms that in the implementation examples, a chemically and structurally pure β-SiC is obtained by sintering the powder of Si and Carbon Black, and, therefore the structural and porous properties of the chlorination product of the reference example 1 coincide with the corresponding characteristic of the implementation example 1. In the reference example 1, β-sic (H. C. Starck, Grade BF-12, ~1 μm) powder has been chlorinated at 1000° C. and then dechlorinated in hydrogen atmosphere and afterwards in conditions analogous to those used in implementation examples 1-3.

The reference example 2 confirms that by mechanical stirring and sintering of Si and CDC powders at 1100° C., a Si/CDC composite is obtained with substantially different structural and porous characteristics than Si/CDC composite with a close Si content in implementation example 2.

REFERENCES

[1] Boukamp, B. A., Lesh, G. C., Huggins, R. A. All-solid lithium electrodes with mixed-conductor matrix. J. Electrochem. Soc. 1981, 128, 725-729.
[2] Kasavajjula, U., Wang, C., Appleby, A. J. Nano- and bulk-silicon-based insertion anodes for lithium-ion secondary cells. J. Power Sources 2007, 163, 1003-1039.
[3] Liu, W.-R., Guo, Z.-Z., Young, W.-S., Sheih, D.-Z., Wu, H.-Z., Yang, M.-H., Wu, N.-L. Effect of electrode structure on performance of Si anode in Li-ion batteries: Si particle size and conductive additive. J. Power Sources 2005, 140, 139-144.
[4] Wilson, a. M., Reimers, J. N., Fuller, E. W., Dahn, J. R. Lithium insertion in pyrolyzed siloxane polymers. Solid State Ionics 1994, 74, 249-254.
[5] Xing, W., Wilson, A. M., Zank, G., Eguchi, K., Dahn, J. R. Pyrolyzed polysiloxanes for use as anode materials in lithium-ion batteries. J. Electrochem. Soc. 1997, 144, 2410-2416.
[6] Xue, J. S., Myrtle, K., Dahn, J. R. An epoxy-silane approach to prepare anode materials for rechargeable lithium ion batteries. J. Electrochem. Soc. 1995, 142, 2927-2935.
[7] Xie; J., Cao, G. S., Zhao, X. B. Electrochemical performances of Si-coated MCMB as anode material in lithium-ion cells. Mater. Chem. Phys. 2003, 88, 295-299.
[8] Holzapfel, M., Buqa, H., Scheifele, W., Novak, P., Petrat, F.-M. A new type of nano-sized silicon/carbon composite electrode for reversible lithium insertion. Chem. Commun. 2005, 1566-1568.
[9] Arie, A. A., Song, J. O., Lee, J. K. Structural and electrochemical properties of fullerene-coated silicon thin film as anode materials for lithium secondary batteries. Mater. Chem. Phys. 2009, 113, 249-254.
[10] Holzapfel, M., Buqa, H., Scheifele, W., Novak, P., Petrat, F.-M. A new type of nano-sized silicon/carbon composite electrode for reversible lithium insertion. Chem. Commun. 2005, 1566-1568.
[11] Yamazaki, Y., Ejiri, H. Surface graphitized carbon material and process for producing the same. U.S. Pat. No. 6,022,518 (1996).
[12] Leis, J. et al., Meetod nanostruktuurse süsinikmaterjali valmistamiseks ping selle meetodiga saadud nanostruktuurne süsinikmaterjal. P200800008 (2008).
[13] Yamada et al, U.S. Pat. No. 5,834,138 (1998).
[14] Omaru et al., U.S. Pat. No. 5,451,477 (1995).
[15] Yoshio, M., Wang, H., Fukuda, K., Abe, T., Ogumi, Z. Soft carbon-coated hard carbon beads as a lithium-ion battery anode material. Chem. Lett. 2003, 32, 1130.
[16] Guo, Z. P., Zhao, Z. W., Liu, H. K., Dou, S. X. Lithium insertion in Si—TiC nanocomposite materials produced by high-energy mechanical milling. J. Power Sources 2005, 146, 190-194.

The invention claimed is:

1. A method for preparing a carbon-encapsulated silicon composite of carbide derived synthetic carbon material and silicon that comprises stages, comprising:
   heating a homogeneous composite comprising silicon particles encapsulated in a metal carbide or non-metal carbide case in an inert environment at temperatures between 300 to 1100° C.; and thereafter
   chemically processing the homogeneous composite comprising silicon particles encapsulated in a metal carbide or non-metal carbide case at temperatures between 300 to 1100° C.

2. The method according to claim 1, wherein the step of chemical processing is used for extraction of atoms of a metal or non-metal from a metal carbide or non-metal carbide case surrounding silicon particles in said homogenous composite and is conducted in a gaseous halogen environment at temperatures between 300 to 1100° C.

3. The method according to claim 2, wherein the step of chemical processing in a gaseous halogen environment is chlorination of a homogeneous composite comprising silicon particles encapsulated in a metal carbide or non-metal carbide case at temperatures at 300 to 1100° C.

4. The method according to claim 1, wherein the inert environment is argon.

5. The method according to claim 1, wherein the homogeneous composite comprising silicon particles encapsulated in a non-metal carbide case is a composite that is prepared through stages, comprising:
   mechanically dispersing a powder of carbon material with silicon powder into a homogeneous mixture; thereafter
   sintering the homogeneous mixture of carbon material and silicon in inert environment at 1200 to 1500° C. to obtain the composite comprising silicon particles encapsulated in a silicon carbide case.

6. The method for preparing a carbon-encapsulated silicon composite of carbide derived synthetic carbon material and silicon according to claim 1, wherein:
   the step of heating a homogeneous composite comprising silicon particles encapsulated in silicon carbide in an inert environment occurs at temperatures between 800 to 1100° C.; and thereafter
   the step of chemically processing comprises chlorinating the homogeneous composite comprising silicon particles encapsulated in silicon carbide at 800 to 1100° C.

7. The method according to claim 6, further comprising preparing the homogeneous composite, comprising:
   mechanically dispersing a carbon material powder into a homogeneous mixture with silicon powder; and thereafter
   sintering the homogeneous mixture of carbon material and silicon in an inert environment at 1200 to 1500° C. to obtain a homogeneous composite comprising silicon particles encapsulated in synthetic carbide.

8. The method according to claim 6, further comprising after chlorination, processing the carbon-encapsulated silicon composite of carbide derived synthetic carbon material and silicon in a reducing environment at 600 to 900° C.

9. The method according to claim 7, further comprising after chlorination, processing the carbon-encapsulated silicon composite of carbide derived synthetic carbon material and silicon in a reducing environment at 800° C.

10. The method according to claim 9, wherein the reducing environment is hydrogen or ammonia.

11. The method according to claim 6, further comprising after chlorination, treating the carbon-encapsulated silicon composite of carbide derived synthetic carbon material and silicon in an inert environment at least at 1000° C.

12. The method according to claim 11, wherein the inert environment is argon.

13. The method according to claim 6, further comprising after chlorination, processing the carbon-encapsulated silicon composite of carbide derived synthetic carbon material and silicon in an oxidative environment at 550 to 1000° C.

14. The method according to claim 13, wherein the oxidative environment is oxygen, water, air, or carbon dioxide.

\* \* \* \* \*